March 26, 1968 R. L. PITCHFORD 3,374,544

FRONT GUN TELESCOPE MOUNT

Filed Sept. 16, 1966

RICHARD L. PITCHFORD
INVENTOR.

BY Frank C. Parker

ATTORNEY 3,374,544
FRONT GUN TELESCOPE MOUNT
Richard L. Pitchford, Brockport, N.Y., assignor to Bausch & Lomb Incorporated, Rochester, N.Y., a corporation of New York
Filed Sept. 16, 1966, Ser. No. 580,079
5 Claims. (Cl. 33—50)

The present invention relates to a gun telescope mount and more particularly relates to improvements in the front mount for the telescope.

Although gun telescopes have been mounted on guns by the use of rubber elements which absorb some of the shock of recoil at the time of gun firing, these devices are usually inadequate to prevent some misplacement of the telescope when used on late model high powered guns. Said misplacement is increased as the rubber elements become more inelastic with age. Therefore, said elements must be replaced after a time if the rubber elements constitute the sole contact between said mount and telescope.

In view of the above facts it is an object of the present invention to provide a front gun telescope mount which reliably positions the telescope over very long periods of use while utilizing the yielding properties of rubber for absorbing shock due to firing the gun.

It is a further object to provide such a device which returns the aiming telescope to its proper aiming position accurately after severe lateral blows or pressures, and displaces the line of sight only a negligible vertical distance when the windage adjustment is set at maximum deviation, the telescope support being adjustable to rock the telescope laterally.

A still further object of the invention is to provide such a device wherein the aiming telescope is normally biased against the adjustment anvils of the rear mount by certain parts of the front mount.

Further objects and advantages will be apparent to those skilled in the art by reference to the following specification taken together with the accompanying drawing, wherein.

Figure 1:
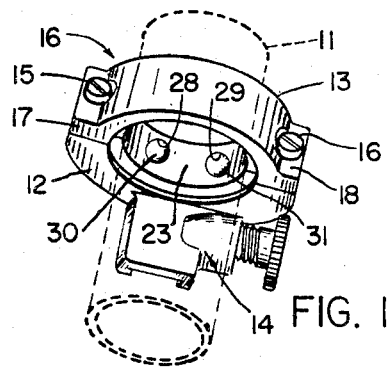
FIG. 1 is a perspective view of a preferred form of the front mount in assembled condition.
Figure 2:
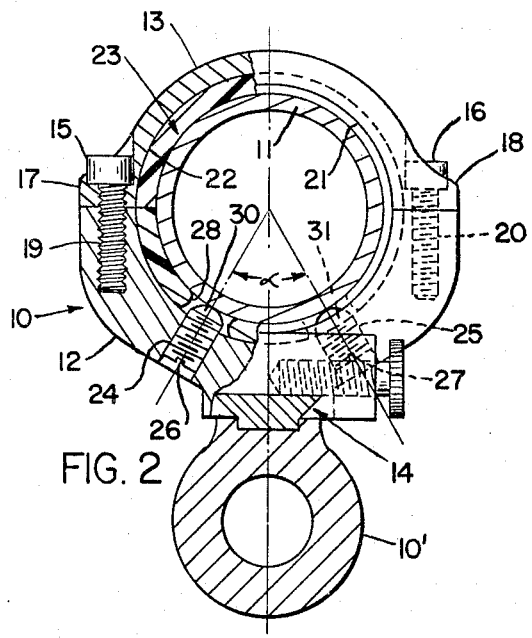
FIG. 2 is a front elevation of said front mount, partly broken away and shown in section.

With reference to FIG. 1 of the drawing, the front mount is represented generally by the numeral 10 mounted on a gun barrel 10', and fragmentarily a telescope casing 11 is shown in dotted lines clamped therein. The front mount 10 is built as a ring-like frame which comprises a lower part 12 and a companion upper part 13. For clamping the mount 10 on the gun, any one of several well-known clamping mechanisms 14 may be provided which is formed integrally with said lower part 12.

On the lower part 12 is clamped the upper part 13 to complete the frame structure and these parts are drawn together to hold the telescope casing 11 therebetween by a pair of clamping screws 15 and 16 which extend through clearance holes in opposite side extensions 17 and 18 on the upper part 15, and engage in tapped holes 19 and 20 formed in the lower part 12. A clearance opening 21 is formed cooperatively in parts 12 and 13 to accommodate the telescope 11, and undercut beneath the surface of said opening 21 is a groove 22 wherein a ring 23 of resilient material such as rubber is held preferably by cementing. The rubber ring 12 is divided at the separation joint between the upper and lower parts so that substantially half of it is fixed in each part 12 and 13.

According to the present invention, a pair of rigid seating elements 24 and 25 are inserted in suitable openings extending through the frame part 12 in substantially the same plane and preferably these elements are screws having means such as screw slots 26 and 27 whereby the screws may be adjusted. Inwardly the screws 24 and 25 extend through corresponding clearance openings 28 and 29 formed in the rubber ring 23. The tips 30 and 31 of screws 24 and 25 lie slightly below the inner surface of ring 23 prior to final stressing of the rubber ring so that upon compression of the ring, the telescope is forced against said tips solidly.

Figure 5:
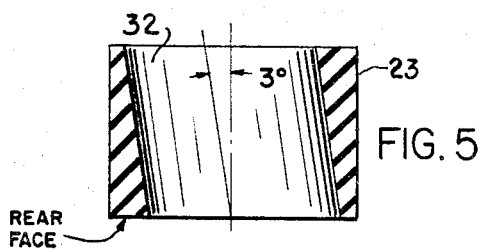
FIG. 5 is a longitudinal sectional view of the part shown in FIG. 4.
Figure 4:
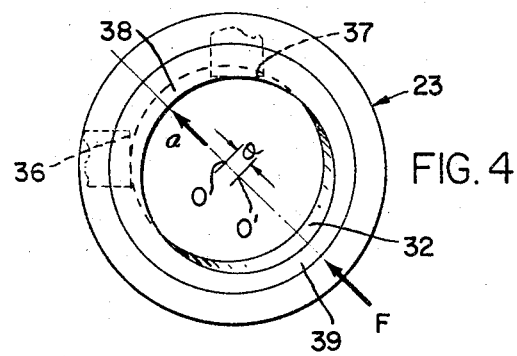
FIG. 4 is an end view of an operating part of the mount per se.
Figure 3:
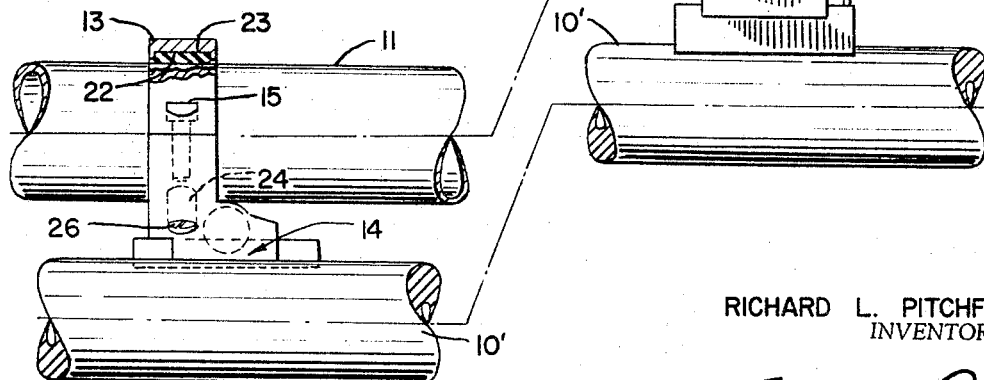
FIG. 3 is a side view of the front mount shown in FIG. 2 together with a companion rear mount, parts thereof being broken away and shown in section.

Another novel feature of the front mount 16 concerns the construction of the inner cylindrical surface 32 of the rubber ring 23. By inclining the axis 33 of the inner surface 32 at about 3° to the axis 34 of the outer diameter 35 in the direction of the arrow $a$, as shown in exaggerated form in FIG. 4, the rearward part of the telescope 11 is biased by the ring 23 against both of the orthogonally arranged adjustable abutment members 36 and 37 whenever the ring 23 is clamped onto the telescope body 11. As shown in exaggerated form in FIGS. 4 and 5, the center of the rear rim 0 of the surface 32 is offset by a distance $\theta$ from the center 0' of the front rim thereof. The thicker portions 38 and 39 of the ring are placed under increasing compressive stress during the tightening of the clamp screws 15 and 16 after the telescope body 11 is seated against the adjusting members 36 and 37. In prior art gun telescope mounts, much of the poor performance of the sighting device is caused by failure of the telescope body to follow the movements of the sight adjustment members in all positions and this defect is usually brought on by excessive friction in the front mount on the telescope body.

With regard to the advantages of the above-described construction, the primary benefit is obtained by yieldably forcing the telescope against the two fixed seating elements 30 and 31 which together provide substantially the advantages of a solid V mount. Furthermore, the telescope casing 11 may be swung about the seating elements 24 and 25 as a pivot through the full windage movements without causing any significant vertical movement of the casing 11. This feature is dependent to a certain extent on the angular spacing of the seating elements 24 and 25, i.e., when the angular spacing is least, the vertical displacement is least and approaches zero. However, testing and experimentation indicate that the angular spacing of $\alpha$ may be as great as 90° without serious vertical displacement of the telescope while making windage adjustments.

The least value of angular spacing $\alpha$ which is practical is determined by the reliability of the centering effect of the seating elements 24 and 25. It will be observed by reference to the drawing that a wide angular spacing $\alpha$ of said elements results in the most reliable centering of the telescope during all windage adjustments but a value $\alpha=45°$ has been found to be effective in most cases. Therefore, the value of spacing should be as given below.

$$45° < \alpha < 90°$$

Another important fact with regard to the present invention is that the integrity of the grip of the rubber ring 23 on the telescope body 11 is maintained throughout all adjusting movements of the telescope and it remains secure in spite of severe setback forces at the time of firing the gun 10'.

In all circumstances and forms of the present invention the cooperative action of the upper part of the rubber ring 23 on the telescope, and the action of the seating elements 24 and 25 in positioning the telescope on the gun correctly for all adjustments thereof results in a mounting device which is simple in structure, low in cost, easy to adjust, and reliable and accurate in use in accordance with the aims and objects of the present invention.

Although only a preferred form of the present invention has been shown and described in detail, other forms and arrangements are possible and changes may be made in the details of construction without departing from the spirit of the invention as defined in the appended claims.

I claim:

1. In a front gun telescope mount having a ring-like frame composed of upper and lower substantially semi-circular parts wherein a clearance opening is formed for the telescope and having retaining means for securing one of said parts in aligned engagement with the other and further having a ring of resilient material held within said opening in contact with the boundary surface thereof, the improvement consisting of two rigid telescope seating elements which are secured in said lower part at angularly spaced positions which lie in the same plane along said boundary surface and are located substantially symmetrically of the vertical transverse center line of said opening, said ring having openings through which said elements extend, the seating surfaces of said elements lying normally slightly below the inner surface of the resilient ring, whereby the compressive force caused in the resilient ring during clamping of the telescope causes a reaction force which firmly seats the telescope on said elements regardless of small pivotal adjusting movements of the telescope about the front mount.

2. A front gun telescope mount as set forth in claim 1 further characterized by said elements being threaded into said lower part and having means for rotating the elements to regulate the effective relative elevation of the seating surfaces of the elements with reference to the inner surface of said ring.

3. A front gun telescope mount as set forth in claim 1 further characterized by the positions of said elements being angularly spaced apart by between 45° and 90°.

4. A front gun telescope mount having a ring-like frame composed of an upper and a lower semi-circular part which cooperate to form a clearance opening for said telescope, said mount including the combination of, a substantially flat strip of resilient material held coextensively in contact with the inner surface of said opening, a pair of seating elements which are secured in said lower part and project into said opening so as to support said telescope, said elements being angularly spaced apart in a plane transverse of said opening symmetrically of the vertical transverse center line of said opening, a pair of transverse openings formed through said strip which accommodate said seating elements, and means for drawing the upper and lower parts together to clamp the telescope therein, whereby the compression of the strip against the telescope primarily insures that the telescope is reliably seated on the seating elements, and secondarily provides for momentary longitudinal movement of the telescope out of nominal position during firing of the gun.

5. A front and rear gun telescope mount which cooperate to hold an aiming telescope on a gun, said rear mount including orthogonally arranged elevation and windage adjusting abutment members, said front mount being composed of mating upper and lower semi-circular parts which are clamped together, said parts having inner surfaces which cooperate to form a cylindrical opening in which the telescope is held, an elastic ring mounted on and clamped by said inner surfaces of said parts against said telescope, said elastic ring having an outer cylindrical surface in contact with said inner surfaces of said parts and having an inner cylindrical surface in contact with said telescope, the axis of said inner cylindrical surface being inclined relative to the axis of said outer cylindrical surface and lying in a radial plane extending substantially midway between said abutment members so that the thickest portion of the rear edge of said ring lies substantially angularly opposite to said members, whereby said thick portion of the ring forces the telescope against said abutment members when the telescope is clamped in place.

References Cited

UNITED STATES PATENTS

| | | | |
|---|---|---|---|
| 870,272 | 11/1907 | Burton | 33—50 |
| 2,486,002 | 10/1949 | Buehler | 33—50 |

SAMUEL S. MATTHEWS, *Primary Examiner.*